(12) United States Patent
Ritter et al.

(10) Patent No.: US 7,673,149 B2
(45) Date of Patent: Mar. 2, 2010

(54) IDENTIFICATION AND/OR AUTHENTICATION METHOD

(75) Inventors: Rudolf Ritter, Zollikofen (CH); Eric Lauper, Bern (CH)

(73) Assignee: Swisscom AG, Bern (CH)

( * ) Notice: Subject to any disclaimer, the term of this patent is extended or adjusted under 35 U.S.C. 154(b) by 1116 days.

(21) Appl. No.: 11/247,487

(22) Filed: Oct. 11, 2005

(65) Prior Publication Data

US 2006/0080525 A1    Apr. 13, 2006

(30) Foreign Application Priority Data

Oct. 11, 2004    (EP)    .................... 04104978

(51) Int. Cl.
G06F 21/00    (2006.01)

(52) U.S. Cl. ...................... 713/186; 382/115

(58) Field of Classification Search ............... 713/186, 713/185, 182; 379/93.02; 708/135; 726/1–36; 235/380–382.5; 705/65–69; 382/115; 902/3; 155/4–10; 704/270.1
See application file for complete search history.

(56) References Cited

U.S. PATENT DOCUMENTS

| 5,420,936 | A | 5/1995 | Fitzpatrick et al. |
| 2002/0095586 | A1 | 7/2002 | Doyle et al. |
| 2002/0194003 | A1* | 12/2002 | Mozer ..................... 704/270.1 |

FOREIGN PATENT DOCUMENTS

EP    1 424 659 A    6/2004

* cited by examiner

*Primary Examiner*—Pramila Parthasarathy
(74) *Attorney, Agent, or Firm*—Pearne & Gordon LLP

(57) ABSTRACT

A method and apparatus for identifying and/or authenticating a user of a mobile device in a server on the basis of fingerprints of the user that have been read through haptic input means of the mobile device with a fingerprint reader in the mobile device.

20 Claims, 1 Drawing Sheet

IDENTIFICATION AND/OR AUTHENTICATION METHOD

REFERENCE DATA

This application claims priority of European patent application 2004EP-104978, filed on Oct. 11, 2004, the contents of which are hereby incorporated by reference.

FIELD OF THE INVENTION

The present invention concerns a method and a system for identifying and/or authenticating a user. The present invention concerns in particular a method and a system for identifying and/or authenticating the user of a mobile device in a server application.

RELATED ART

It is possible to build data connections over a mobile radio network with many of today's mobile devices such as for example mobile telephones, PDAs (Personal Digital Assistant), laptops, etc. with integrated mobile radio interface etc. The user of a mobile device can for example access a remote server over such connections (for example over the Internet, over an extranet or over a WAP network) and exchange data in both directions with this server.

In this respect, the access to certain data (for example confidential or secured data) in the remote server can be protected and granted only to identified and authenticated users. Since mobile devices and SIM cards can be stolen or be used by several different users, no personal identification can be ensured.

An additional identification and/or authentication is often achieved in that a secret code (for example a password or the combination of a user identification with a secret password) is requested.

If the entered data correspond with the reference data, the user is considered authenticated and is granted access to the secured data in the remote server.

Entering such identification and/or authentication data can in certain circumstances prove impractical, for example when they have to be entered on the keypad of a mobile telephone. Furthermore, it is a known fact that passwords are often chosen too easy, so that they are then easy to guess, or called for to be too complicated, so that they are then forgotten and noted elsewhere.

Biometric identification and authentication methods are also known in which the identity of a user is recognized and/or verified on the basis of biometric parameters. PDAs, laptops, mobile radio telephones and input means (for example keyboards and mouses, with fingerprint readers) are also already known and are used in order to record and send to a remote server user-personal parameters. If the fingerprint is recognized, the user is considered authenticated.

Such methods however usually require an additional sensor on the mobile device, which in the case of greatly miniaturized devices is difficult to integrate. Furthermore, an additional step for recording the biometric parameters is required for accessing the secured server, which makes the access less comfortable.

If the fingerprint is not recognized (for example because the user has fingers that are dirty or moist with sweat or because he has pulled his finger in another direction over the fingerprint sensor or with another pressure), the process has to be repeated, and the user is invited to record a new fingerprint. This proves impracticable.

The authentication of the user is furthermore performed on the basis of the result of a single reading of the fingerprints, which implies a certain incertitude, depending on the accuracy of the recognition method.

BRIEF SUMMARY OF THE INVENTION

It is thus an aim of the invention to propose a method for identifying and/or authenticating the user of a mobile device that does not have the disadvantages of the prior art methods.

Another aim of the invention is to propose a more secure method for identifying and/or authenticating the user of a mobile device in a server application.

A further aim of the invention is to propose an identification and/or authentication method that is more practical and easy for the user.

These aims are achieved with a method, a server and a program product that have the characteristics of the corresponding independent claim. Preferred embodiments are furthermore indicated by the independent claims.

These aims are achieved in particular with a method for identifying and/or authenticating a user of a mobile device in a server application on the basis of fingerprints of said user, that are recorded through haptic input means, said method having the following steps:

the user navigates with said haptic input means in a free part of the server and/or enters commands with said haptic input means, in order to move in said free part of the server, simultaneously, finger prints of said user are recorded through said haptic input means, at the latest when said user wishes to access part of the server that requires an identification respectively an authentication, the user is identified respectively authenticated on the basis of said fingerprints, access to said part of the server is granted without explicit identification respectively authentication request if said user has been identified respectively authenticated in the previous step.

This has the advantage that the user may access the secure part of the server often directly and without explicit authentication. In a preferred embodiment, the menu of the server is designed in such a manner that sufficient fingerprints are read during normal use of the haptic means, for example during navigation of the user in said menu, before the user reaches this secure part of the server.

This method also has the advantage that it is completely compatible with mobile devices that do not have haptic input means with built-in fingerprint readers. In this case, a conventional authentication (for example on the basis of passwords) is simply required if the user wishes to enter the secured zone.

These aims are also achieved with a server with a freely accessible part and a secure part, with:

a menu system wherein a user can move and/or navigate with the aid of commands at least in said freely accessible part, a comparator for comparing the user fingerprints recorded during a session with reference fingerprints, said menu system being designed in such a manner that the access to said part of the server is granted without explicit invitation for identification respectively authentication if said user has been identified respectively authenticated whilst moving in said freely accessible part on the basis of said comparator.

These aims are achieved in particular also with a program product that can be loaded directly in a memory area, with a program that executes the above mentioned method if it runs on a processor.

Thanks to the method of the invention and the corresponding server and/or program product, the user is identified and/or authenticated iteratively through his fingerprints that are read while he navigates in the freely accessible part of the server. He thus does not have to be invited to enter his identification and/or authentication data explicitly. The identification and/or authentication further occur on the basis of a larger quantity of fingerprint data and the security is thus increased.

The analysis of fingerprint data can further require considerable data processing performance. If the identification and/or authentication of the user are carried out in a mobile device with limited power, this operation can be relatively long. Thanks to the inventive method and the corresponding server and/or program product, the identification and/or authentication of the user is carried out preferably during his navigation in the freely accessible part of the server, before he wishes to access a secure part. The identification and/or authentication are thus for example carried out in idle time and are thus time-uncritical. The user can thus preferably access immediately the secure part of the server whenever he wishes.

BRIEF DESCRIPTION OF THE DRAWINGS

The invention will be better understood on the basis of the description of a preferred embodiment and with the aid of the drawing, which shows.

DETAILED DESCRIPTION OF THE INVENTION

Figure 1:
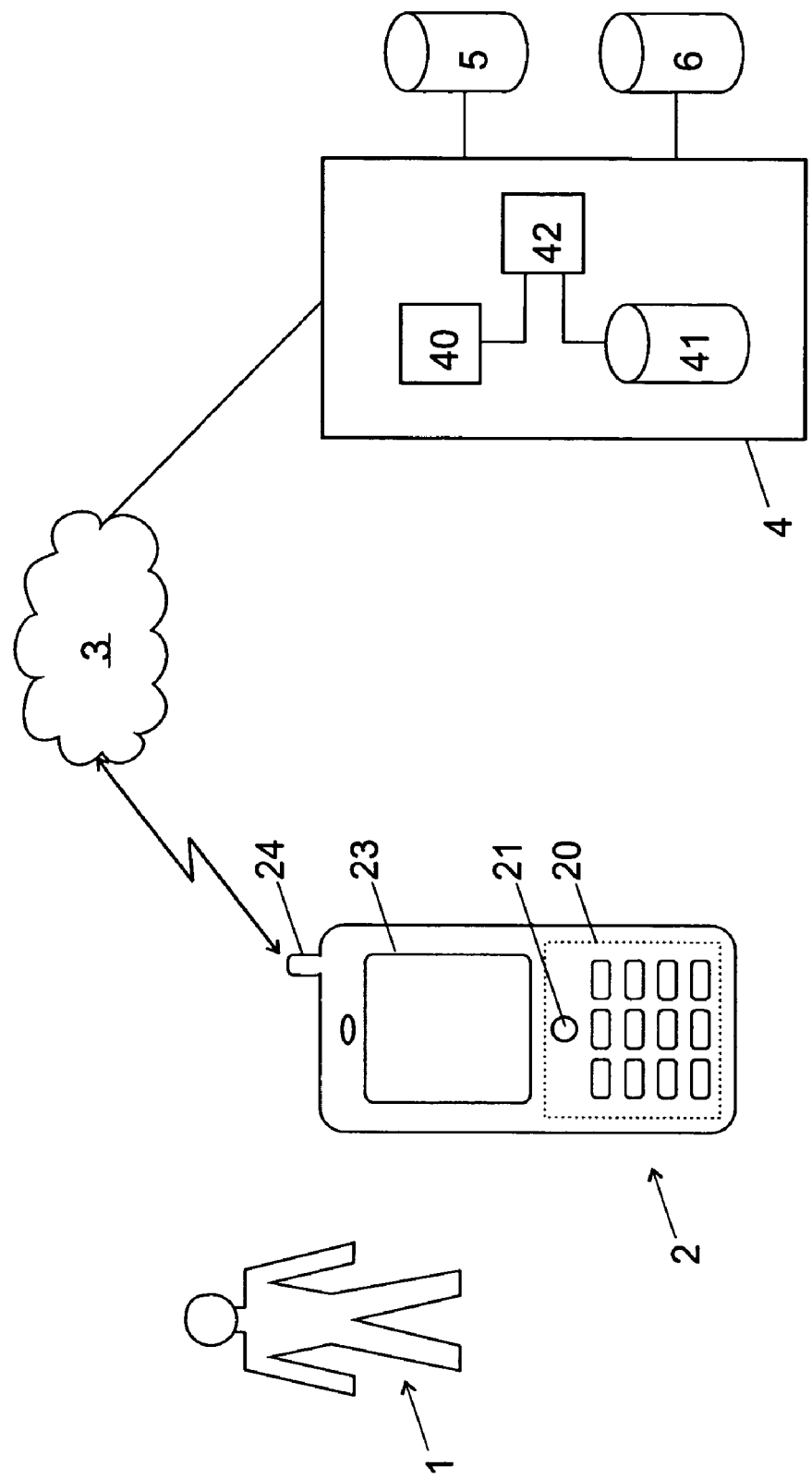
FIG. 1: a diagrammatic representation of a system according to an embodiment of the invention.

According to the invention, a data connection is built over a mobile radio network 3 between a mobile device 2 of a user 1 and a server 4, for example a WEB or WAP server that is operated for example by a value-added service provider or by the user's company. The server 4 can also correspond to a LAN (Local Area Network), for example to a company LAN with several servers, that is accessible from the Internet for authenticated users.

The mobile device 2 has a mobile radio interface 24 in order to communicate in the mobile radio network 3 and send and receive data. The mobile device 2 preferably includes an identification module, not represented, for identifying the user 1 and/or the mobile device 2 in the mobile radio network 3. The identification module is for example a removable chip card with a memory area in which identification data of the user are stored. If the mobile radio network 3 is for example a GSM network, the chip card is for example a SIM card. The mobile device 2 preferably also has a display 23 and haptic input means that are used with the fingers in order to control the mobile device 2 and/or the remote server over the mobile radio network 3. The haptic input means can be for example a keyboard, a keypad, a roll element (for example a so-called jog-wheel), a mouse, a stick, with which a cursor can be controlled, a touch screen or a tactile screen, a touch-sensitive surface etc.

According to the invention, the haptic input means 20 include a fingerprint reader in such a manner that fingerprints are recorded when commands are entered, for example when a key is pressed or when the cursor is moved.

In a preferred embodiment, the haptic input means include a capacitive touch-sensitive sensor with several rows of capacitive electrodes that react to finger movements in order to control a cursor on the screen of the mobile device and/or in order to click on options or objects. With the same sensor, fingerprints can also be recorded. Such haptic input means allow for example the unnoticed recording of fingerprints when commands are entered. If a finger moves on the capacitive surface, a fingerprint is simultaneously recorded and the direction, speed and duration of the movement is used as command for controlling the local mobile device and/or a remote server through a cursor.

The fingerprint reader could also be integrated in another navigation button 21 that is commonly used for selecting options in the menus shown on the display 23.

The fingerprint reader is for example a small and wide reader with for example a resolution of 8 points by 196 points. Such a fingerprint reader can preferably detect the movement of a finger on its surface for example capacitively and/or optically and control for example a cursor on the display 23 of the mobile device 2 according to the direction and/or speed of this movement and simultaneously scan the finger's fingerprints. Such a fingerprint reader can thus also be used as a navigation button in the frame of the invention.

The mobile radio interface 24, the identification module, the haptic input means 20 with the fingerprint reader and the display 23 are preferably integrated in a single device 2 such as for example in a single mobile telephone or PDA (Personal Digital Assistant). In a variant embodiment of the invention, these elements are however distributed over two or more devices. The mobile device 3 of the invention then consists for example of the combination of a mobile telephone and of a PDA, whereas the mobile telephone for example includes for example a mobile radio interface and an identification module and the PDA has haptic input means with a fingerprint reader. As display of the mobile device, the display of the PDA for example is then used. The mobile telephone and the PDA then preferably communicate over a wireless or contactless connection at close range or over a wired connection. The wireless connection at close range is for example a Bluetooth, an infrared or a WiFi connection. In the case of a wired connection, the mobile telephone and the PDA communicate together for example over a serial or a USB connection.

In one embodiment of the invention, the mobile radio network 3 is for example a GSM, HSCSD, GPRS, UMTS, Bluetooth, WLAN (Wireless Local Area Network) network. Further embodiments are however also possible in the frame of the invention.

The server 4 is preferably a WEB, WAP or SMS server, a SQL server with a database, a data server, a network of several servers in a LAN, etc., and can be reached over a data channel of the mobile radio network (for example over the Internet or another packet channel). The server can interpret commands of the users, the term "command" in this frame having a wide meaning and including all kind of data that are received from the user and that influence the server's behavior. The server can for example be made available for example by a value-added service provider, for example a company, a bank, a government, a mobile radio network operator, etc.

The server includes a freely accessible part 5 and a secure part 6. In the freely accessible part, for example, can be general information about the service provider and the value-added services offered by the service provider, commercial information, advertising etc. that are for example distributed over one or several WEB pages or WAP cards. The user 1 preferable does not need to be identified in order to access this information. It is however also possible in the frame of the invention that a user identification is required if the user wishes to access certain pages or data of the freely accessible part; in this case, the user can for example be invited to enter his identity manually. This identity is not verified or at least not with biometric means, and can for example be stored in a cookie in the mobile device.

In the secure part 6 of the server, for example, financial information, medical information, user- or company data, etc. can be available. It is also possible to offer in this part 6 value-added services, such as for example the possibility of placing a payment order from a bank account or a credit card account, of receiving targeted and personal medical advice, of ordering products or services, etc. Further types of confidential information and services are also possible within the frame of the invention.

In order to gain access to this confidential information 6 and to the linked services, the user 1 must be identified and authenticated. This means that his identity must be known and verified.

The identification of the user can occur for example on the basis of the calling number of the mobile device or on the basis of other data that are read from the identification module in the mobile device. Identification by comparing the user's recorded fingerprints with reference fingerprints of several users is also possible. Within the frame of the invention, the user can also type in his identity, speak it or spell it orally over a voice server.

In one embodiment of the invention, the server 4 preferably includes a memory area 40 that serves for example for temporarily storing identification and/or authentication data. As will be explained further below, the temporarily stored identification and/or authentication data include for example the fingerprints of the user 1 read by the mobile device 2.

In this embodiment, the server 4 preferably also includes a reference database 41 that contains the identification and/or authentication reference data of the users registered on the server 4. The reference data include for example reference fingerprints that have been recorded and stored for example during a registration procedure of the users.

Fingerprints can be stored and treated either as image or preferably as vector or signature that can be determined preferably in the mobile device 2 or possible in the server 4 from the fingerprint.

The server 4 preferably also includes a comparator 42 for analyzing and comparing digital fingerprint data. The comparator 42 is preferably used for ascertaining with a certain security whether the fingerprints read by the mobile device 2 correspond to certain reference fingerprints. The comparator is preferably implemented in the form of a program that runs for example on the server, not represented, or on the mobile device 2. It would be for example possible to use Hidden Markov Models (HMMs), neuronal networks and/or Viterbi networks in order to compare fingerprints. The comparator preferably also performs a normalization of the fingerprints in order to compensate for rotations, noise, other geometrical distortions that can arise through pressure differences.

Establishing the connection between the mobile device 2 and the server 4 is triggered for example by actuating a certain key, by selecting a certain option in a menu, by entering an address in a browser etc. on the page of the mobile device 2. Only after the connection has been established can the user 1 reach for example a public welcome page of the server 4. The welcome page is preferably displayed on the display 23 of the mobile device 2. The welcome page preferably includes a menu from which different options (that correspond for example to different value-added services) can be selected. In order to select an option in the menu, the user 1 preferably uses the haptic input means 20 of the mobile device 2, preferably haptic input means 21 with an integrated fingerprint reader, in order for example to move a cursor on a graphical or text interface.

According to the invention, when the haptic input means 21 are actuated during the navigation of the user 1 through the freely accessible part of the server 4, the fingerprints of the actuating user 1 are simultaneously read by the integrated fingerprint reader. The fingerprints are transmitted together or separately from the commands to the server 4 and stored as image or preferably as vector in the memory area 40 of the server 4. The conversion into a vector preferably occurs in the fingerprint reader. It would also be possible to transmit simultaneously to the server 4 several fingerprints or a function determined from several fingerprints in the mobile device.

Certain commands that are entered by the user through the haptic input means can be interpreted by the mobile device (for example by the browser program in the mobile device) and not necessarily transmitted to the server. If fingerprints are recorded during the input of these commands, these fingerprints are however preferably used and transmitted to the server.

Conversely, it can also happen that certain commands are entered with the mobile device without a fingerprint being recorded in this case.

In a first embodiment of the invention, the user 1 is identified and authenticated with the aid of his fingerprints.

The read and stored fingerprints are preferably analyzed by the comparator 42 and compared with the reference fingerprints stored in the reference database 41 to determine with a certain predefined probability whether they correspond to the fingerprints of a user registered on the server.

The identification of the user 1 preferably occurs iteratively. Each time the fingerprints of the user 1 are read by the navigation button 21, the stored fingerprint data that pertain to the user 1 are for example completed and again compared with the reference fingerprint data. Thus, at each new comparison, the number of possible identities for the user thus preferably becomes smaller until for example an identity is recognized with a predefined probability by the comparator.

If the user wishes to access secured and/or confidential information 6 or services, the identity recognized by the comparator 42 is then proposed to the user 1 for example in the form of a user name, preferably on the display 23 of the mobile device 2. The user 1 must then confirm or refuse this identity preferably by actuating haptic input means.

If the user 1 does not confirm this identity, the user 1 can then for example be invited on a next menu page of the server 4 to enter his identity himself (for example with the aid of the keyboard 20). In a variant embodiment, a list of other identities is proposed to the user 1, from which he can select is claimed identity preferably with the aid of the navigation button 21. These identities are proposed for example by the mobile device 2 and/or by the server 4. They include for example identities that are stored in the mobile device 3 (for example in the identification module). They preferably also include identities that have been recognized by the comparator 42 with a smaller probability as possible identities for the user 1.

The user can thus be identified on the basis of his fingerprints, his own indications, his calling number and/or data from his identification module. If he wishes to access a secure part 6 of the server 4, he must however also be authenticated—this identity must be verified.

If he has been reliably authenticated during navigation in the freely accessible part of the sever by comparison between the fingerprints and the reference fingerprints, he can, preferably without further controls and in particular without explicit authentication, reach the secure part of the server and also perform operations in this part. In a preferred embodiment, the server merely verifies whether the accessing user is still the previously authenticated user, for example by verifying an identification of the session. A valid authentication preferably remains valid only during a predetermined period of time. The probability with which the user 1 has been authenticated in the mobile device 2 and/or in the server 4 is thus preferably considered to be always smaller with time if no new fingerprints of the user 1 are read. In another embodiment, the identification and/or authentication begins anew each time a new connection is established.

If the server 4 at this point in time cannot authenticate the user 1 with the required certainty, an explicit authentication is required before the user can reach the secure part of the server. The user can for example be invited to have further fingerprints recorded with the fingerprint reader 21, whereas instructions for the correct use of the sensor ("not too fast", "correct direction of movement" etc.) can be reproduced.

If the authentication fails despite these further attempts, the user can be invited to authenticate himself otherwise, for example with a password or with other biometric parameters.

The menu system in the freely accessible part of the server 4 is preferably designed in such a manner that the user is forced to have his fingerprints read several times if he wishes to move from the free part to the secure part. For example, several cursor movements or option selection operations are required in order for at least two (possibly considerably more) fingerprints to be recorded before the user arrives on the page through which he can enter the secure part of the server 4. It can also intentionally be required that the user performs movements of his finger in several different directions to move the cursor before he reaches the secure part. This allows several different fingerprints to be collected and reduces the risk that a user has to be explicitly authenticated.

The user is considered authenticated if the probability of a wrong identification (respectively authentication) is smaller than a predetermined threshold. This threshold is preferably determined by the operator of the server 4.

If the user is identified and authenticated on the basis of his fingerprints according to an embodiment of the invention, it is then not necessary that he should have to enter his identity and/or a secret for example with the keyboard of the mobile device in order to be authenticated in the secure part of the server 4.

In another embodiment of the invention, only the identification of the user is carried out with the aid of the fingerprint data in the server application. The user 1 is then invited to have this automatically determined identity verified for example by a password.

In one embodiment of the invention, a reference database is located in the mobile device 2 itself. Fingerprints are stored for example in the identification module (or in the mobile device 2) during a registration process. These reference fingerprints are then preferably the fingerprints of the usual user of the identification module in the mobile device 2. It is also possible to store several reference fingerprints that correspond to different users of the same mobile device 2. The program is then downloaded as applet from the server 4. During the registration process, the program asks the user or users for example to actuate the haptic input means 21 to get reference prints, until sufficient data have been read for each user to build good reference fingerprints. These reference fingerprints are then stored in the reference database in the mobile device and/or in the identification module.

The program is preferably signed electronically by the server 4 and/or the corresponding value-added service provider in order to prevent falsification.

The comparison between the reference fingerprint and the prints determined during a session can also be carried out by a program in the mobile device 2. The result of this comparison is then signed electronically and sent to the server 4 (with or without request). The comparison is performed for example by a comparator (for example in the form of a program in the identification module and/or in the mobile device 2). If the identification module includes a processor, the comparator program runs for example on the processor of the identification module and/or on the processor of the mobile device 2 itself. The comparator program is preferably downloaded for example as applet by the server 4.

One advantage of the embodiment of the invention in which the reference database and the comparator are located in the mobile device 2 is that no fingerprint data are exchanged between the mobile device and the server 4 over the mobile radio network. The fingerprint data thus remain secure and preferably confidential with the user 1.

In a variant embodiment, the comparator in the mobile device 2 is used for identifying the user 1, whilst comparison results from a comparator 42 in the server 4 are used for the authentication, or inversely.

In yet a further embodiment, the reference fingerprints are stored in a further central server, not represented. The central server is administered for example by a third party or by the operator of the mobile radio network 3 for several service providers and/or several servers. The comparator in this case preferably also runs on the central server. The read fingerprints are then sent for example over the mobile radio network 3 to the comparator on the central server. This has among others the advantage that the user has to register only once with a single server in order to store his fingerprints and to gain an authenticated access to different servers of different service providers.

The menus through which the user must navigate in order for his fingerprints to be read several times are preferably generated by the server 4 and displayed on the display 23 of the mobile device 2.

In one embodiment of the invention, these menus are however generated by a program in the mobile device. The necessary fingerprint data of the user 1 are thus preferably read before the connection is established with the server 4. If the comparator also runs in the mobile device, the connection is then built only if the user 1 has been identified and/or authenticated.

The identification and/or authentication of the user 1 can preferably be performed with the fingerprints of different fingers of the user 1. In one embodiment of the invention, the menus in the free accessible part of the server 4, in the secure part of the server 4 and/or in the mobile device 2 depend on the finger or fingers used by the user 1 for actuating for example the navigation button 21 and that have possibly lead to his identification respectively authentication. Different menus are for example generated if the user 1 uses the right or the left hand in order to navigate in the menu system and has possibly been identified respectively authenticated with the fingerprint data of this hand. The user can also access for example different options by using a particular hand and/or particular fingers. Further criteria can however also be used for generating different menus. These criteria include for example the user's identity, the authentication degree of the user 1, etc.

The identification respectively authentication of the user with a fingerprint reader can according to the invention also take into account the personal direction, movement, duration and/or rhythm of the movement of the user's finger over the sensor; in this way, a dynamic fingerprint is used that contains more information than static ones. Determining the direction and speed of the movement can also be used in order to normalize the fingerprints, such as for rotating them depending on the direction of the movement.

The invention claimed is:

1. Method for identifying and/or authenticating a user of a mobile device including an identification module for identifying the user and/or the mobile device, in a server application on the basis of fingerprints of said user, that are recorded through haptic input means, said method comprising the steps of:
   the user enters commands with said haptic input means, in order to access a freely accessible part of a server,
   simultaneously with accessing said freely accessible part of the server, finger prints of said user are recorded through said haptic input means,
   when said user wishes to access a secure part of the server that requires an identification of the user, the user is identified on the basis of said fingerprints,
   access to said secure part of the server is granted without issuing an explicit identification request to the user if the user has been identified on the basis of said fingerprints,
   wherein the user is identified in that several fingerprints recorded consecutively during the same session are compared with reference fingerprints of the user,
   wherein Hidden Markov Models and/or neural networks are used for comparing fingerprints recorded during a session with reference fingerprints of the user.

2. The method of claim 1, wherein an explicit identification respectively authentication is required if said user has not been identified respectively authenticated reliably through said fingerprints.

3. The method of claim 2, wherein the user is invited to have his fingerprints read once again if he has not been identified respectively authenticated reliably through said fingerprints.

4. The method of claim 2, wherein the user is invited to enter a password if he has not been identified respectively authenticated reliably through said fingerprints.

5. The method of claim 1, wherein the use is considered identified respectively authenticated if the probability of a wrong identification respectively authentication is smaller than a predetermined threshold.

6. The method of claim 5, wherein said threshold is set by the operator of said server.

7. The method of claim 1, wherein
   said user is identified in a first step on the basis of data in said identification module or on the basis of self-entered indications, and wherein
   the user identity determined during said first step is verified on the basis of fingerprints recorded during movement of the user in said freely accessible part of the server in order to authenticate said user.

8. The method of claim 1, wherein said server is designed in such a manner that several fingerprints of the user are read with said haptic input means when this user navigates in said freely accessible part with said haptic input means in order to reach said secure part.

9. The method of claim 1, with a registration process during which reference fingerprints of the user are stored in a reference database of said server.

10. The method of claim 1, with a registration process during which reference prints of the user are stored in a reference database in said mobile device.

11. The method of claim 1, with a registration process during which reference fingerprints of the user are stored in a database in the server of a third party that performs user identifications for several servers of different providers.

12. The method of claim 1, wherein said identification respectively authentication occurs in said server.

13. The method of claim 1, wherein said identification respectively authentication occurs in the server of a third party that performs user identifications for several servers of different providers.

14. The method of claim 1, wherein said identification respectively authentication occurs in said mobile device.

15. The method of claim 14, wherein a user identification program is downloaded in said mobile device.

16. The method of claim 15, said program being signed electronically.

17. A server that is accessible by an input device adapted to record the fingerprint of a user, said server comprising:
   a freely accessible part;
   a secure part;
   a processor executing software for providing a menu system to the input device, wherein a user can access, using the input device with the aid of commands, said freely accessible part, and wherein one or more fingerprints of a user are recorded by the input device during said access; and
   a comparator for comparing the user fingerprints recorded during said access with reference fingerprints,
   wherein said menu system is adapted such that access to said secure part of the server is granted without issuing an explicit invitation for identification to the user if the user has been identified while accessing said freely accessible part on the basis of said comparing:
   wherein the user is identified in that several fingerprints recorded consecutively during the same session are compared with reference fingerprints of the user,
   wherein Hidden Markov Models and/or neural networks are used for comparing fingerprints recorded during a session with reference fingerprints of the user.

18. The server of claim 17, wherein the user is invited to have his fingerprints read several times if the user wishes to move from said freely accessible part into said secure part and if the user has not been previously identified respectively authenticated.

19. The server of claim 17, further comprising a reference database for storing said reference fingerprints.

20. Program product that can be loaded directly in a memory area, with a program that executes the method of one of the claims 1 to 16 if it runs on a processor.

* * * * *